United States Patent Office 3,158,520
Patented Nov. 24, 1964

3,158,520
METHOD OF SEALING PLASTIC FILM
Lee O. Edmonds and James A. Shotton, Bartlesville, Okla., assignors to Phillips Petroleum Company, a corporation of Delaware
No Drawing. Filed Mar. 3, 1961, Ser. No. 93,047
6 Claims. (Cl. 156—307)

This invention relates to an improved method of sealing plastic film. In one specific aspect, this invention relates to an improved method of heat sealing plastic film.

The heat sealing of various thermoplastic resins has been practiced for some time and numerous techniques have been developed by which many of the well known resins of this type have been bonded to themselves and to other substrates. However, the strength of the seals is unduly limited and furthermore, the extension of these techniques to the sealing of polyethylene, for example, has not been highly successful. The bonds so formed are frequently a point of weakness such that under stress failure occurs at the seal. For example, polyethylene bags filled with grain, dry chemicals, or the like, often fail at the closure when sealed by conventional heat sealing procedures. Heat sealing when applied to thermoplastic materials can be defined as a process step whereby the surfaces to be welded or sealed together are heated so as to fuse them together.

Accordingly, an object of this invention is to provide an improved method of heat sealing plastic film prepared from 1-olefin polymers.

Another object of this invention is to provide an improved method of heat sealing plastic film whereby the strength of the seal is increased.

Other objects, advantages, and features of our invention will be readily apparent to those skilled in the art from the following description and appended claims.

We have discovered that when the surfaces of the plastic film to be sealed by heat are precoated with certain specific materials, the strength of the bond is significantly increased.

The inventive process is applicable to plastic materials prepared from the polymerization of 1-olefins having a maximum of 6 carbon atoms per molecule. The polymerization product can be a homopolymer or a copolymer, or a mixture thereof. The inventive process is applicable to the heat sealing of a plastic film prepared from the aforementioned plastic material, said plastic film preferably having a thickness ranging from 0.25 to 25 mils. The inventive process is applicable to the heat sealing of plastic film surfaces wherein the surfaces prepared from a different plastic material to be sealed are from the same or different 1-olefin polymers. The plastic films sealed by the process of this invention are prepared from polymers or copolymers of 1-olefins such as ethylene, propylene, 1-butene, 1-pentene, 4-methyl-1-pentene, 3-methyl-1-butene, 3,3-dimethyl-1-butene, and the like, polymerized by any suitable procedure.

The contacting surfaces of the plastic film to be sealed are coated with a material selected from the group consisting of stearic acid, vegetable drying oils, mineral oils, drying oils prepared from fish oil, and low molecular weight wax from the pyrolysis of polyethylene. Mineral oils applicable to the present invention can be paraffinic, naphthenic or aromatic and will normally have a viscosity in the range of 30–375 Saybolt Universal Seconds (SUS) at 100° F. and a flash point of at least 350° F. The vegetable drying oils applicable to the inventive process include linseed oil, cottonseed oil, tung oil, perilla oil, soybean oil and dehydrated castor oil. Of the vegetable oils, linseed oil is preferred.

The low molecular weight vis-broken polyethylenes are prepared by pyrolysis of polyethylene, preferably of a high density polyethylene. Briefly, the low molecular weight vis-broken polyethylene can be prepared by subjecting polyethylene to heating at about 700–900° F. and distilling the low molecular weight product from the pyrolysis zone as it forms, the process preferably effected in the absence of air. These product materials have a molecular weight in the range between about 200 and 800. Distillation is generally effected under a reduced pressure, preferably not higher than 100 millimeters of mercury and more preferably less than 25 millimeters of mercury.

The quantity of coating material applied to the surface of the plastic film is that which will coat the surface with a thin film. Application can be made with a brush, felt pad, a capillary tube feed arranged to deliver a small amount of coating material which is fed as the film layers are pressed together, or any other suitable means. It is within the scope of this invention to coat one or both of the contacting surfaces of plastic film.

The sealing step can be effected by simultaneously pressure contacting and heating the coated surfaces of the plastic film. This can be accomplished, for example, by passing two layers of plastic film, with the coated surfaces lying together, between two pressure rollers, one or both of the rollers being heated. The seal thus formed is known as a flat seal.

Edge sealing can be accomplished, for example, by clamping two layers of the plastic film between steel plates, a portion of the contacted layers projecting outside the plates. The contacting surfaces of the plastic film projecting outside the plates are coated in the inventive manner. That portion of the plastic film layers projecting from the steel plates is radiant heated.

The heating temperature employed in the sealing step is sufficiently high so that the layers of the plastic film to be sealed together will be molten. Therefore, the heating temperature is normally above 300° F. The temperature of the heat source employed will vary considerably depending upon the procedure utilized. For example, when heat sealing is effected by conduction, the temperature of the source will be essentially that required for the seal. When sealing by radiant heat, the temperature of the source will be sufficiently high to provide the required temperature at the seal point. The time of heating will vary, depending upon the thickness of the film being sealed, the material from which the film is fabricated, and the temperature employed. The heating time will generally be in the range from 0.5 to 100 seconds.

The use of pressure while performing this heating step is desirable when conduction heating is employed. When radiant heat is employed in an edge sealing operation, excellent seals are obtained by allowing the molten edges to join without contact with a pressure bar or roll.

The following example is presented as illustrative of the effectiveness of coating the contacting surfaces of the plastic film to be sealed.

EXAMPLE

A high density (0.960 specific gravity) polyethylene film 8 mils in thickness was sealed to itself. Edge sealing and flat sealing techniques were employed. The surface areas to be joined were coated with the various materials listed in Table I. After sealing, the seals were tested for tensile strength in order to determine the effectiveness of the coating materials employed.

The edge seals were prepared by clamping two layers of the polyethylene film between ⅛ inch thick 2.5 x 6.0 inch steel plates with 0.064 inch of the film projecting outside the plates. A flat nichrome wire, disposed parallel to the exposed edge and 0.020 inch therefrom, was heated by an electric current to a temperature of 1700–1800° F., thus providing radiant heat by which means the film was sealed and a bead formed immediately adjacent to the edges of the clamped plates. The time for forming the seal was approximately one second.

The flat seals were prepared using a commercial "Polyjaw" sealer comprising an electrically heated bar working in opposition to a rubber covered bar. Two layers of polyethylene film were laid together and the edges placed under pressure between the jaws for eight seconds. The temperature of the heated bar was regulated at 330° F. A thin sheet of Teflon (polymerized tetrafluoroethylene) was placed between the heated jaw and the film to prevent sticking.

For these tests, the surface of the film at and adjacent to the surface to be sealed was moistened with the coating material to be tested prior to the sealing operation. The seals were then made, removed from the clamps and cut into strips for testing. The tensile strengths were determined by pulling on an Instron testing machine at a crosshead speed of 20 inches per minute and the results (Table I) expressed as pounds per inch of width. The materials tested and the results obtained are shown in Table I:

Table I

| Coating Material | Sealability | Tensile (lb./in.) | |
|---|---|---|---|
| | | Edge Seal | Flat Seal |
| None (Control) | Excellent | 18.6 | 14.2 |
| Stearic Acid | do | 24.8 | 21.8 |
| Vis-broken Polyethylene [1] | do | | 18.5 |
| Mineral Oil [2] | do | | 18.2 |
| Linseed Oil | do | | 18.7 |
| Paraffin Wax | Good | | 13.7 |
| Oleic Acid | do | 16.2 | |

[1] Prepared by the method disclosed in column 2.
[2] 327.5 SUS @ 100° F., Viscosity Index—102, Pour Point—(+5)° F., Flash Point—465° F., API Gravity—29.8.

There is a significant improvement in the tensile strength of the seals where stearic acid, visbroken polyethylene, mineral oil and linseed oil were employed as coating materials. These obtained results are unexpected and not fully understood. For example, while the sealing process employing stearic acid as a coating material provided a seal having a tensile strength increase of as much as 50 percent, the use of oleic acid as a coating material provided no advantage whatever. Also, mineral oils and vis-broken polyethylene provide very significant improvements in the strength of heat seals while paraffin wax is ineffective.

As will be evident to those skilled in the art, various modifications of this invention can be made, or followed, in the light of the foregoing disclosure and discussion without departing from the spirit and scope thereof.

We claim:

1. In the process of sealing plastic film, which comprises contacting a surface of the plastic film prepared form a polymer of 1-olefins having a maximum of six carbon atoms per molecule with another surface of a plastic film prepared from a polymer of 1-olefins having a maximum of six carbon atoms per molecule, and heating at least a portion of the contact area; an improvement which comprises coating at least one of said surfaces prior to the heating step solely with a material selected from the group consisting of stearic acid, vegetable drying oils, mineral oils, drying oils prepared from fish oils and a low molecular weight wax from the pyrolysis of polyethylene.

2. In the process of sealing polyethylene film which comprises contacting a surface of said polyethylene film with another surface of said polyethylene film, and heating at least a portion of the contact area; an improvement which comprises coating at least one of said surfaces prior to the heating step solely with a material selected from the group consisting of stearic acid, vegetable dyring oils, mineral oils, drying oils prepared from fish oils and a low molecular weight wax from the pyrolysis of polyethylene.

3. The process of claim 2 wherein the coating material employed is stearic acid.

4. The process of claim 2 wherein the coating material employed is a low molecular weight wax from the pyrolysis of polyethylene.

5. The process of claim 2 wherein the coating material employed is a mineral oil.

6. The process of claim 2 wherein the coating material employed is linseed oil.

References Cited in the file of this patent

UNITED STATES PATENTS

| | | |
|---|---|---|
| 2,281,646 | Whitehead | May 5, 1942 |
| 2,383,230 | Voke | Aug. 21, 1945 |
| 2,455,910 | Alderson | Dec. 14, 1948 |
| 2,551,087 | Barnhart et al. | May 1, 1951 |
| 2,614,953 | Anglada | Oct. 21, 1952 |
| 2,664,378 | Heller | Dec. 29, 1953 |
| 2,723,468 | Marcy | Nov. 15, 1955 |